United States Patent [19]

Schroder

[11] 4,038,673
[45] July 26, 1977

[54] VIEW FINDER FOR PHOTOGRAPHIC APPARATUS UTILIZING OBJECTIVES HAVING DIFFERENT FOCAL LENGTHS

[75] Inventor: Rolf Schroder, Baldham, Germany

[73] Assignee: AGFA-Gevaert Aktiengesellschaft, Leverkusen, Germany

[21] Appl. No.: 716,182

[22] Filed: Aug. 20, 1976

[30] Foreign Application Priority Data

Aug. 30, 1975 Germany .................... 7527515[U]

[51] Int. Cl.$^2$ .................... G03B 13/02; G03B 13/10
[52] U.S. Cl. .................... 354/222; 354/197; 354/219
[58] Field of Search ............ 354/219, 222, 197, 195, 354/199, 166, 167

[56] References Cited

U.S. PATENT DOCUMENTS 3,961,344   6/1976   Baisch et al. .................... 354/222

Primary Examiner—John Gonzales
Attorney, Agent, or Firm—Peter K. Kontler; John Kurucz

[57] ABSTRACT

A view finder for use in photographic apparatus which embody or are connectable with two objectives having different focal lengths has a field lens, an eye lens behind the field lens, and two intermediate lenses each of which is pivotable in the housing about a fixed axis between an operative position in which it extends across the path of scene light between the eye lens and the field lens and a retracted position. A link is articulately connected to both intermediate lenses whereby the connection between the link and one of the intermediate lenses constitutes a pin-and-slot connection. A second pin-and-slot connection attaches the link to one arm of a two-armed lever which is pivotably mounted in the housing and the other arm of the lever is coupled to a reciprocable slide by a third pin-and-slot connection. When the slide is moved in one direction, one of the intermediate lenses is retracted and the other lens moves to operative position. The movements of the intermediate lenses are reversed when the slide is moved in the other direction. A prestressed looped spring engages the connections between the link and the intermediate lenses to yieldably urge either intermediate lens to its operative position.

10 Claims, 3 Drawing Figures

VIEW FINDER FOR PHOTOGRAPHIC APPARATUS UTILIZING OBJECTIVES HAVING DIFFERENT FOCAL LENGTHS

BACKGROUND OF THE INVENTION

The present invention relates to photographic apparatus for use with plural objectives having different focal lengths. More particularly, the invention relates to improvements in view finders for still cameras or motion picture cameras which can be used with objectives having different focal lengths. Photographic apparatus for use with lenses having different focal lengths are disclosed, for example, in the commonly owned copending application Ser. No. 716,297 filed Aug. 20, 1976 by Rolf Schroder et al.

When the operator of a camera which is designed for use with objectives having different focal lengths decides to switch from the use of a first objective (e.g., an objective of normal or average focal length) to the use of another objective (e.g., a telephoto lens), it is necessary to adjust the view finder, normally by removing a first lens and inserting a second lens, or vice versa. Heretofore known view finders of the just outlined character are complex and expensive, mainly because the mechanism which is used to impart movements to interchangeable lenses is bulky, sensitive and prone to malfunction.

SUMMARY OF THE INVENTION

An object of the invention is to provide a novel and improved convertible view finder for still cameras or motion picture cameras which can be used with objectives having different focal lengths.

Another object of the invention is to provide the view finder with simple, compact, rugged and inexpensive means for moving certain lenses of the view finder to and from operative positions.

A further object of the invention is to provide a novel and improved operative connection between the actuating means and the movable lenses of a convertible view finder for cameras which can be used with two objectives having different focal lengths.

An additional object of the invention is to provide a view finder which can be employed with equal advantage in relatively simple still cameras or motion picture cameras for use by novices or amateur photographers as well as in highly sophisticated cameras for use by advanced photographers or for professional photography.

The invention is embodied in a view finder for photographic apparatus which can utilize several objectives having different focal lengths. The view finder comprises a field lens which is mounted in the camera body and serves for admission of scene light which travels toward an eye lens located behind and spaced apart from the field lens, first and second intermediate lenses which are located between the field lens and eye lens and are respectively mounted on parallel first and second pivots provided in the camera body, and means for moving the intermediate lenses between first and second positions in which the first and second intermediate lenses respectively extend across the path of scene light behind the field lens. The moving means comprises a link which is articulately connected to the first and second intermediate lenses (one of these articulate connections is a pin-and-slot connection), and a device which moves the link. The link, the two intermediate lenses and the camera body between the fixed pivots for the intermediate lenses constitute the four components of a parallel motion.

The novel features which are considered as characteristic of the invention are set forth in particular in the appended claims. The improved view finder itself, however, both as to its construction and its mode of operation, together with additional features and advantages thereof, will be best understood upon perusal of the following detailed description of certain, specific embodiments with reference to the accompanying drawing.

DESCRIPTION OF THE PREFERRED EMBODIMENTS

Figure 1:
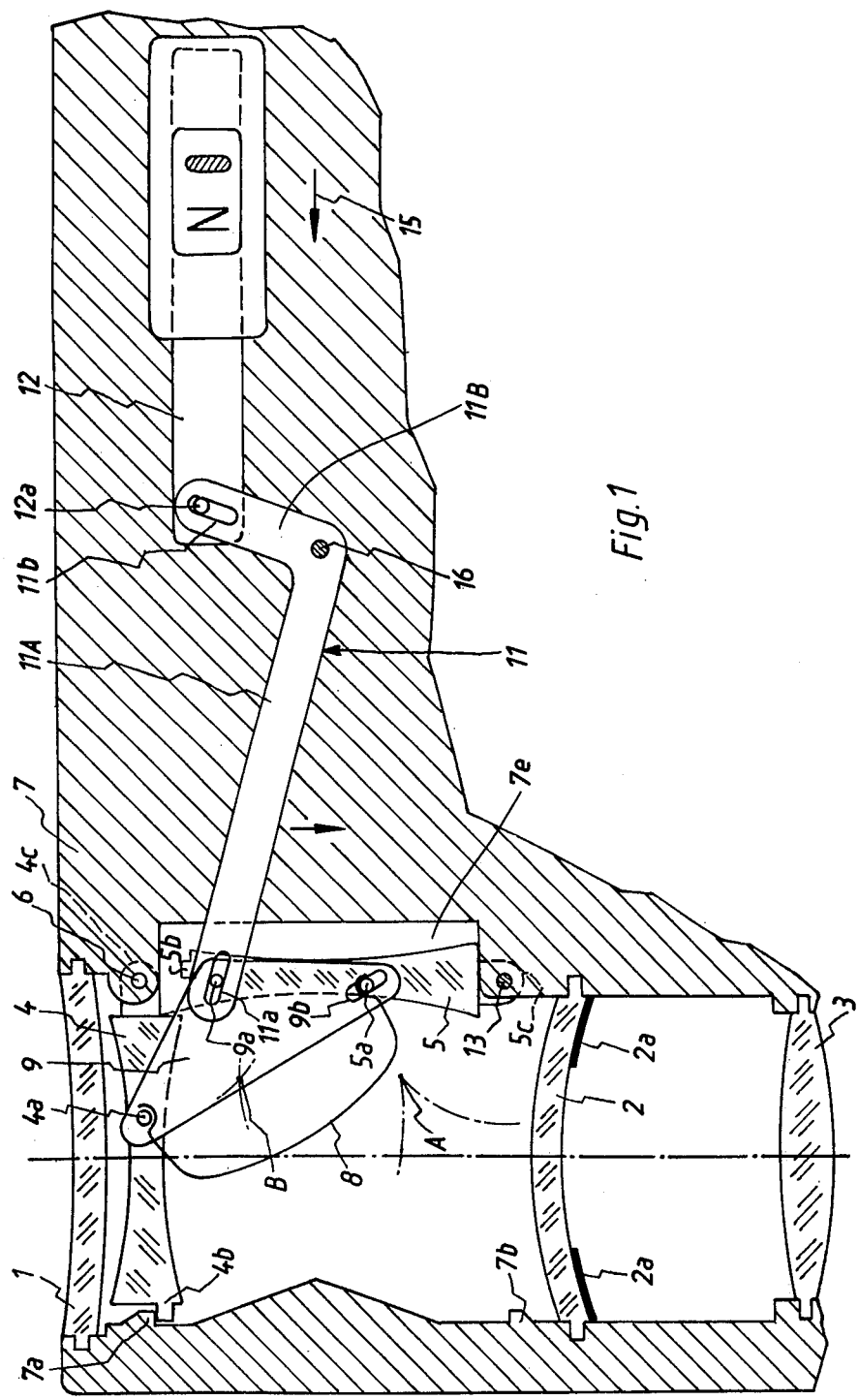
FIG. 1 is a fragmentary sectional view of a photographic apparatus having a view finder which embodies the invention, one of the intermediate lenses being known in operative position.

Referring to FIG. 1, there is shown a portion of the body or housing 7 of a photographic apparatus which can be used with two objectives having different focal lengths. A suitable photographic apparatus for use with two objectives having different focal lengths is disclosed in the aforementioned commonly owned copending application Ser. No. 716,297 of Rolf Schroder et al. The improved view finder comprises a concavo-convex field lens 1 which is installed in the body 7 at the front side of the photographic apparatus and serves to admit scene light which travels toward a biconvex eye lens 3 mounted in the body 7 behind the field lens 1. Such light passes through a concavo-convex reflex lens 2 mounted in the body 7 between the lenses 1, 2 and having a reflecting frame 2a at the rear side thereof. The view finder further comprises two biconcave intermediate lenses 4 and 5 one of which assumes its operative position when the photographic apparatus is used with an objective having a first focal length and the other of which must be moved to operative position when the photographic apparatus is used with an objective having a different second focal length. The lens 4 is nearer to the field lens 1 and has an eyelet 4c which is turnable on a fixed pivot 6 installed in or forming part of the body 7. The lens 5 has an eyelet 5c which is turnable on a second fixed pivot 13 located behind the pivot 6, as seen in the direction of travel of scene light toward, through and beyond the field lens 1. The pivot 13 is parallel to the pivot 6.

Figure 3:
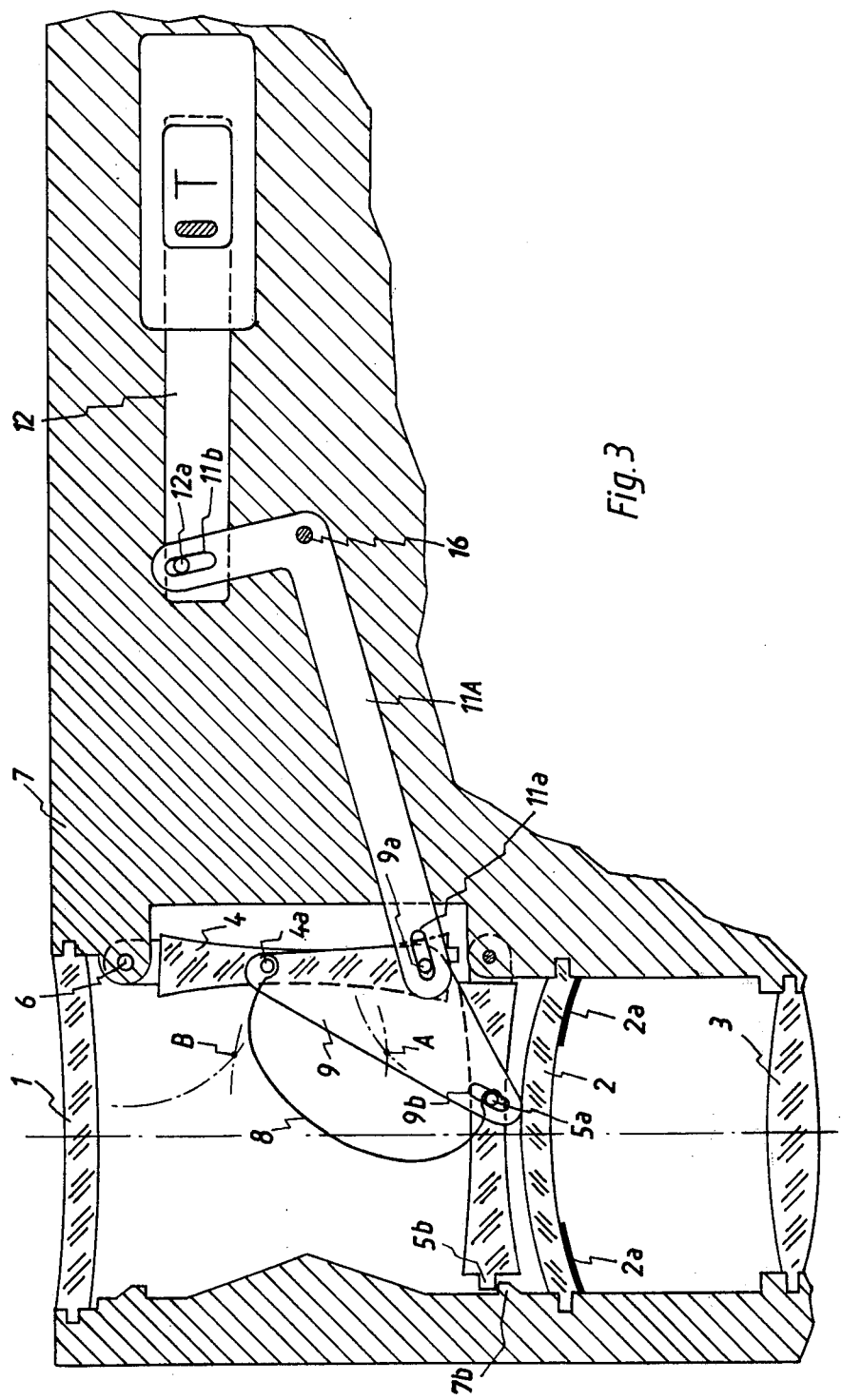
FIG. 3 illustrates the structure of FIG. 1 but with the other intermediate lens in operative position and the one intermediate lens in retracted position.

FIG. 1 shows the intermediate lenses 4 and 5 in first positions in which the lens 4 extends across the path of scene light by the lens 5 is retracted into a recess 7e of the body 7. This recess is located between the pivots 6, 13 at one side of the path for incoming scene light. FIG. 3 shows the intermediate lenses 4 and 5 in the second positions in which the lens 5 extends across the path of scene light but the lens 4 is retracted into the recess 7e. The body 7 comprises a first stop 7a which is engaged by a projection 4b of the lens 4 in the first positions of the lenses 4, 5, and a second stop 7b which is engaged by a projection 5b of the lens 5 in the second positions of the lenses 4, 5. In FIG. 1, the lens 4 is closely adjacent to the field lens 1. In FIG. 3, the lens 5 is distant from the lens 1.

The means for moving the intermediate lenses 4 and 5 between the positions of FIGS. 1 and 3 comprises a link 9 which is articulately connected to a median portion of the lens 4 (between the pivot 6 and projection 4b) by a pin or stud 4a of the lens 4. The link 9 is further articulately coupled to the intermediate lens 5 by a pin-and-slot connection 5a, 9b. The pin 5a is located between the pivot 13 and the projection 5b. A median portion of the link 9 is articulately coupled to the lefthand arm 11A of a lever 11 by a pin-and-slot connection 9a, 11a. The lever 11 is mounted on a shaft 16 which is fixed to the body 7 and the other arm 11B of the lever 11 is articulately coupled to one end of a reciprocable actuating member or slide 12 by a pin-and-slot connection 11b, 12a. The slide 12 is accessible at the outside of the body 7 and is movable in and counter to the direction indicated by arrow 15.

The view finder further comprises resilient means for biasing either of the intermediate lenses 4 and 5 to it operative position. Such resilient means includes a prestressed looped spring 8 one end of which engages the pin 4a and the other end of which engages the pin 5a.

It will be noted that the body 7 (between the pivots 6 and 13), the link 9 and the intermediate lenses 4, 5 constitute the four components of a parallel motion or four-bar linkage.

THE OPERATION

When the user of the camera decides to move a different objective into register with the light-admitting aperture (not shown) of the photographic apparatus, the intermediate lens 4 must be retracted into the recess 7e and the intermediate lens 5 must be moved to the operative position of FIG. 3. To this end, the user pushes or pulls the slide 12 in the direction indicated by arrow 15 whereby the pin 12a pivots the lever 11 about the axis of the shaft 16 in a counterclockwise direction, as viewed in FIG. 1. The pin 11a of the lever 11 pivots the link 9 clockwise, as viewed in FIG. 1, whereby the link 9 turns on the pivot pin 4a and the surface bounding its slot 9b causes the pin 5a to pivot the intermediate lens 5 anticlockwise about the axis of the pivot 13. The angular position of the intermediate lens 4 remains unchanged during the initial stage of movement of the slide 12 in a direction to the left, as viewed in the drawing.

Figure 2:
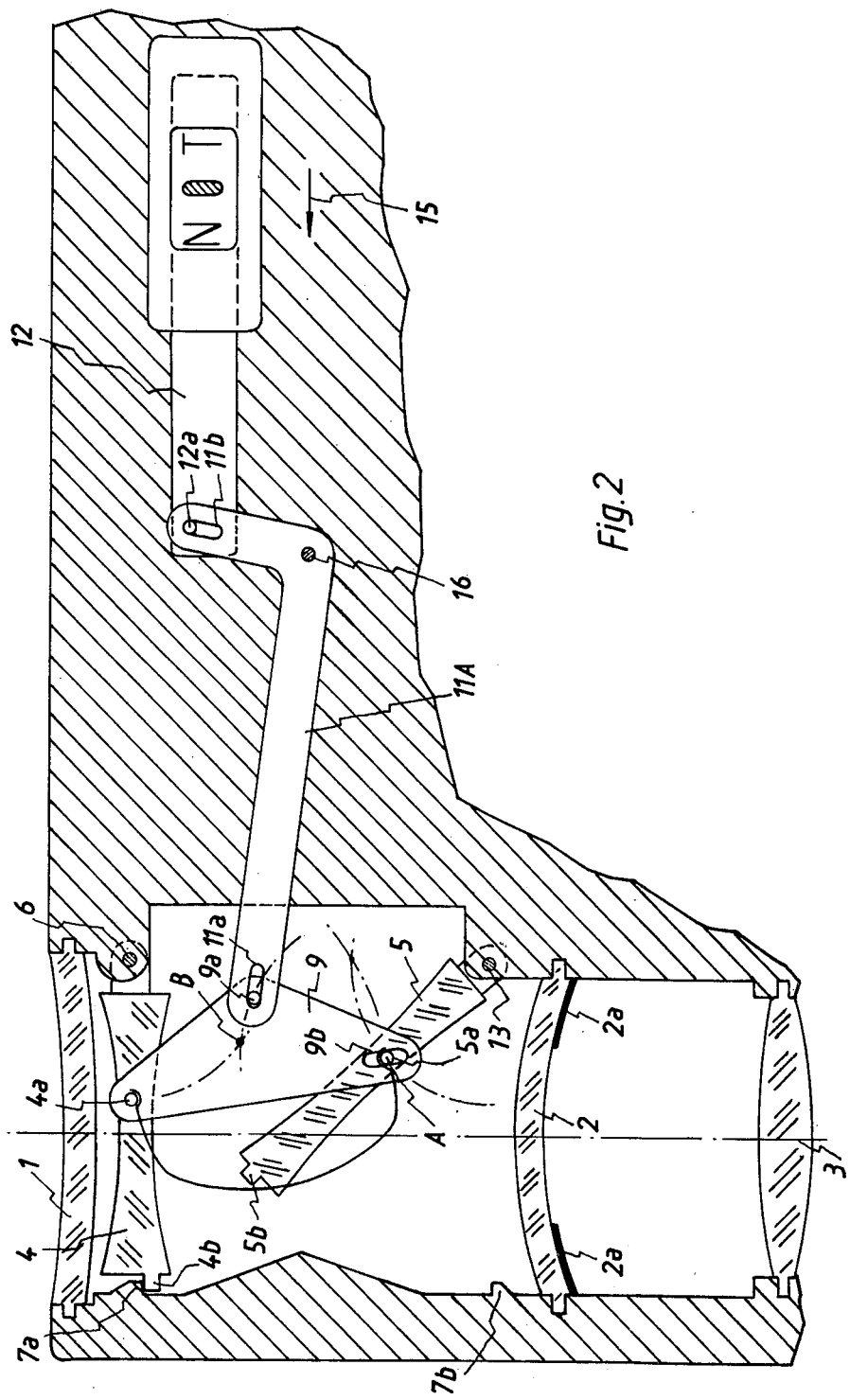
FIG. 2 illustrates the structure of FIG. 1, with the other intermediate lens in an intermediate position between operative and retracted positions.

The link 9 begins to pivot the intermediate lens 4 anticlockwise when the lens 5 reaches the intermediate position of FIG. 2, i.e., when the pin 9a is located in the left-hand end of the slot 11a and the pin 5a assumes the position A. Such anticlockwise pivotal movement of the lens 4 takes place simultaneously with further anticlockwise pivotal movement of the lens 5 (beyond the position of FIG. 2), and the lens 5 is arrested when its projection 5b engages the stop 7b. The lens 4 is then located in an intermediate position in which the pin 4a assumes the position B. The slide 12 continues to move in the direction indicated by arrow 15 whereby the link 9 continues to pivot the slide 4 anticlockwise toward the retracted position of FIG. 3 in which the lens 4 is received in the recess 7e. During this final stage of movement of the slide 12, the projection 5b of the lens 5 continues to abut against the stop 7b and the pin and slot 5a, 9b move with respect to each other. The same result can be obtained if the link 9 is merely turnable on the pin 5a and the link has a slot which receives the pin 4a of the lens 4.

In FIG. 1, the lower end of the prestressed spring 8 urges the pin 5a in a direction away from the pin 4a and thereby biases the projection 4b against the stop 7a. In FIG. 3, the spring 8 reacts against the pin 4a and causes the pin 5a to bias the projection 5b against the stop 7b.

In order to return the intermediate lenses 4 and 5 to the (first) positions of FIG. 1, the user of the camera simply moves the slide 12 back to the position of FIG. 1. The movements of lenses 4, 5 are then effected in a different sequence, i.e., the lens 4 is expelled from the recess 7a during the first stage of return movement of the slide 12, the lenses 4, 5 thereupon pivot in unison (clockwise, as viewed in the drawing) until the projection 4b engages the stop 7a, and the lens 5 thereupon continues to pivot to return into the recess 7e.

The view finder may comprise two springs 8, two links (one in front of the other behind the lenses 4, 5, as viewed in the drawing), and one or two levers 11. Also, the spring or springs 8 can be replaced by other types of means for biasing the intermediate lenses to operative positions.

An important advantage of the improved view finder is that the means for alternately moving the intermediate lenses 4 and 5 to and from operative positions is simple, rugged, inexpensive and occupies little room. Moreover, the spring 8 cooperates with the projections 4b, 5b and stops 7a, 7b to insure that the movements of both intermediate lenses to operative positions are reproducible with a high degree of accuracy and that the intermediate lenses remain in selected positions until and unless the user decides to shift the slide 12.

The lenses 4 and 5 preferably consist of suitable synthetic plastic material and the pins 4a, 5a can form integral parts of the respective intermediate lenses. However, it is equally possible to provide discrete mounts for the intermediate lenses 4, 5 and to attach the pins 4a, 5a to the respective mounts. The same applies for the eyelets 4c, 5c; these eyelets may form integral parts of the respective intermediate lenses or they may be provided on or made integral with lens mounts.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. In a photographic apparatus for use with objectives of different focal length, a view finder comprising a field lens for admission of scene light; first and second intermediate lenses disposed behind said field lens; fixed first and second pivots for said first and second intermediate lenses; a link; first and second articulate connections between said link and said first and second intermediate lenses, one of said connections constituting a pin-and-slot connection; and means for pivoting said intermediate lenses through the medium of said link about the axes of said first and second pivots between first and second positions in which said first and second lenses respectively extend across the path of scene light behind said field lens.

2. A view finder as defined in claim 1, further comprising a support for said first and second pivots, said support, said first and second intermediate lenses and said link together constituting the four components of a parallel motion.

3. A view finder as defined in claim 1, further comprising first and second stops, said first and second intermediate lenses respectively abutting said first and second stops in said first and second positions.

4. A view finder as defined in claim 3, further comprising resilient means for biasing said intermediate lenses against the respective stops.

5. A view finder as defined in claim 1, wherein said means for pivoting comprises a reciprocable actuating member, a lever pivotable about a fixed axis and having first and second arms, a first pin-and-slot connection between said actuating member and one arm of said lever, and a second pin-and-slot connection between said link and the other arm of said lever.

6. A view finder as defined in claim 1, wherein said pivots are parallel to each other and are located one behind the other, as considered in the direction of travel of scene light through and beyond said field lens.

7. A view finder as defined in claim 1, further comprising an eye lens located behind and spaced apart from said field lens, said intermediate lenses being located between said field lens and said eye lens.

8. A view finder as defined in claim 1, wherein said intermediate lenses are biconcave lenses.

9. A view finder as defined in claim 1, wherein said first intermedate lens is closely adjacent to said field lens in said first positions of said intermediate lenses and said second intermediate lens is distant from said field lens in the second positions of said intermediate lenses.

10. A view finder as defined in claim 1, further comprising resilient means for yieldably urging said intermediate lenses to either of said positions, including a prestressed looped spring having a first end engaging the pin of said one articulate connection and a second end engaging the other of said articulate connections.

* * * * *